US009600075B2

(12) United States Patent
Grant et al.

(10) Patent No.: US 9,600,075 B2
(45) Date of Patent: Mar. 21, 2017

(54) HAPTIC EFFECTS WITH PROXIMITY SENSING

(71) Applicant: Immersion Corporation, San Jose, CA (US)

(72) Inventors: Danny A. Grant, Laval (CA); Pedro Gregorio, Verdun (CA); Robert Andre Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 169 days.

(21) Appl. No.: 14/529,868

(22) Filed: Oct. 31, 2014

(65) Prior Publication Data

US 2015/0054768 A1 Feb. 26, 2015

Related U.S. Application Data

(63) Continuation of application No. 13/022,185, filed on Feb. 7, 2011, now Pat. No. 8,898,564, which is a continuation of application No. 11/744,636, filed on May 4, 2007, now Pat. No. 7,890,863.

(60) Provisional application No. 60/828,195, filed on Oct. 4, 2006.

(51) Int. Cl.
*G06F 3/01* (2006.01)
*G06F 1/32* (2006.01)
*G06F 3/041* (2006.01)
*G06F 3/0354* (2013.01)

(52) U.S. Cl.
CPC ............ *G06F 3/016* (2013.01); *G06F 1/3231* (2013.01); *G06F 3/03545* (2013.01); *G06F 3/0416* (2013.01); *Y02B 60/1289* (2013.01)

(58) Field of Classification Search
CPC ..... G06F 3/016; G06F 3/03545; G06F 3/0416
See application file for complete search history.

(56) References Cited

U.S. PATENT DOCUMENTS

| 4,980,519 A | 12/1990 | Mathews |
| 4,988,981 A | 1/1991 | Zimmerman et al. |
| 5,311,175 A | 5/1994 | Waldman |
| 5,956,291 A | 9/1999 | Nehemiah et al. |
| 5,982,352 A | 11/1999 | Pryor |
| 6,680,677 B1 | 1/2004 | Tiphane |
| 7,232,986 B2 | 6/2007 | Worthington et al. |

(Continued)

FOREIGN PATENT DOCUMENTS

| EP | 0 556 999 A1 | 8/1993 |
| EP | 0556999 A1 | 8/1993 |

(Continued)

OTHER PUBLICATIONS

Jun Rekimoto et al.; "SmartPad: A Finger-Sensing Keypad for Mobile Interaction"; Short Talk: Haptic Interfaces; CHI2003: New Horizons; pp. 850-851.

(Continued)

*Primary Examiner* — Omar Abdul-Ali
(74) *Attorney, Agent, or Firm* — Miles & Stockbridge P.C.

(57) ABSTRACT

A method of generating a haptic effect on a device includes detecting a position of an object relative to the device. The method further includes, based at least on the position, determining a gesture indicated by the object, and generating the haptic effect on the device based on the determined gesture, where the haptic effect is generated without the object contacting the device.

24 Claims, 3 Drawing Sheets

(56) References Cited

U.S. PATENT DOCUMENTS

| | | |
|---|---|---|
| 7,296,240 B1 | 11/2007 | Yalovsky et al. |
| 7,427,979 B2 | 9/2008 | Park et al. |
| 8,381,135 B2 | 2/2013 | Hotelling et al. |
| 2002/0003469 A1 | 1/2002 | Gupta |
| 2003/0016253 A1 | 1/2003 | Aoki et al. |
| 2003/0038776 A1 | 2/2003 | Rosenberg et al. |
| 2003/0234768 A1 | 12/2003 | Rekimoto et al. |
| 2005/0024341 A1 | 2/2005 | Gillespie et al. |
| 2006/0161870 A1 | 7/2006 | Hotelling et al. |
| 2006/0187211 A1 | 8/2006 | Uusitalo et al. |
| 2007/0119698 A1 | 5/2007 | Day |

FOREIGN PATENT DOCUMENTS

| | | |
|---|---|---|
| EP | 1 241 558 A2 | 9/2002 |
| JP | 06-043998 A | 2/1994 |
| JP | 11278173 A | 10/1999 |
| JP | 2000194427 A | 7/2000 |
| JP | 2001084051 A | 3/2001 |
| JP | 2002-149312 A | 5/2002 |
| JP | 2002-287862 A | 10/2002 |
| JP | 2002312095 A | 10/2002 |
| JP | 2003016502 A | 1/2003 |
| JP | 2003186622 A | 7/2003 |
| JP | 2003-330618 A | 11/2003 |
| JP | 2006012184 A | 1/2006 |
| WO | 92/00559 A1 | 1/1992 |
| WO | 02/37236 A2 | 10/2002 |
| WO | 2006020304 A2 | 2/2006 |

OTHER PUBLICATIONS

Official Communication dated Jun. 15, 2010 issued in EP Application No. 10160246.4-1245.

HAPTIC EFFECTS WITH PROXIMITY SENSING

RELATED APPLICATIONS

This application is a continuation of U.S. patent application Ser. No. 13/022,185, filed Feb. 7, 2011, which is a continuation of U.S. patent application Ser. No. 11/744,636, filed May 4, 2007 and issued as U.S. Pat. No. 7,890,863 on Feb. 15, 2011, which claims the benefit of U.S. Provisional Patent Application No. 60/828,195, filed Oct. 4, 2006. The disclosure of each of the preceding applications is hereby incorporated by reference.

FIELD OF THE INVENTION

One embodiment of the present invention is directed to a haptic feedback system. More particularly, one embodiment of the present invention is directed to a haptic feedback system that utilizes proximity sensing.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen-only interfaces. This shift allows increased flexibility, reduced parts count, and reduced dependence on failure-prone mechanical buttons and is in line with emerging trends in product design. When using the touchscreen input device, a mechanical confirmation on button press or other user interface action can be simulated with haptics.

For portable devices, cost is an important driving factor. Therefore, to generate haptic effects a single low cost actuator is generally used, for example an eccentric rotating mass ("ERM") motor or an electromagnetic motor. These actuators are able to produce strong magnitude haptic outputs. However, they also require a certain amount of time to achieve their peak haptic output (e.g., approximately 50 ms). These actuators are also used to provide feedback to the user when operating a touch sensitive input of a touchscreen device. For example when the user presses a button on a touchscreen a haptic effect is output to give the sensation of pressing a mechanical button. It is desired to output the haptic effect at the same time the user has selected the button in the interface. However, due to the time it takes to have actuator reach a desired magnitude, the haptic effect lags behind the button press event. If this lag becomes too long the user will not perceive the button press and the haptic effect as a single event.

SUMMARY OF THE INVENTION

One embodiment is a method of generating a haptic effect on a device by detecting a position of an object relative to the device. The method further includes, based at least on the position, determining a gesture indicated by the object, and generating the haptic effect on the device based on the determined gesture, where the haptic effect is generated without the object contacting the device.

DETAILED DESCRIPTION

One embodiment is a portable device that includes a haptic feedback system with proximity sensing. The haptic system initiates the haptic feedback before a user actually touches a touchscreen or other input area based on the proximity information.

Figure 1:
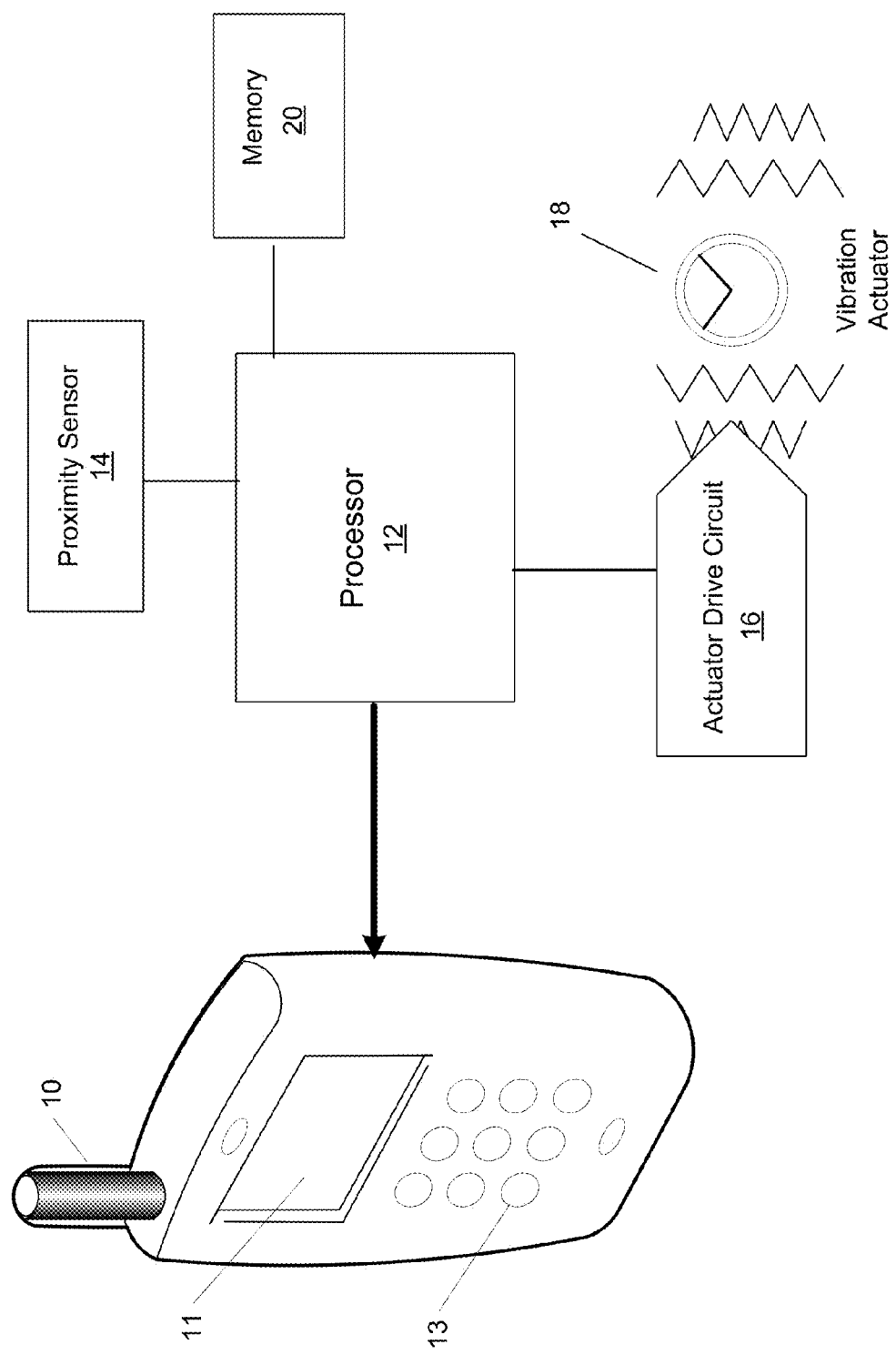
FIG. 1 is a block diagram of a cellular telephone in accordance with one embodiment.

FIG. 1 is a block diagram of a cellular telephone 10 in accordance with one embodiment. Telephone 10 includes a screen 11 and an input area, touchscreen 13, that includes "keys" and can include other types of user interfaces, including menus, etc. In another embodiment, the keys of telephone 10 can be mechanical type keys. Internal to telephone 10 is a haptic feedback system that generates vibrations on telephone 10. In one embodiment, the vibrations are generated on the entire telephone 10. In other embodiments, specific portions of telephone 10 can be haptically enabled by the haptic feedback system, including the entire touchscreen 13 or individual keys of touchscreen 13.

The haptic feedback system includes a processor 12. Coupled to processor 12 is a memory 20 and an actuator drive circuit 16, which is coupled to a vibration actuator 18. Although the embodiment of FIG. 1 is a cellular telephone, embodiments can be implemented with any type of handset or mobile/portable device, or any device that uses an actuator to generate vibrations. For example, other embodiments may not include touchscreens but are haptic devices with other types of input areas. Other input areas besides touchscreens may be a mini-joystick, scroll wheel, d-Pad, keyboard, touch sensitive surface, etc. As with a cellular telephone, for these devices there is a desire for a haptic effect to be generated on the input area and/or the entire device.

Processor 12 may be any type of general purpose processor, or could be a processor specifically designed to provide haptic effects, such as an application-specific integrated circuit ("ASIC"). Processor 12 may be the same processor that operates the entire telephone 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect.

Processor 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10). Memory device 20 can be any type of storage device, such as random access memory ("RAM") or read-only memory ("ROM"). Memory 20 stores instructions executed by processor 12. Memory 20 may also be located internal to processor 12, or any combination of internal and external memory.

A proximity sensor 14 is coupled to processor 12. Proximity sensor 14 detects when a finger (or stylus) is in close proximity to but not in contact with touchscreen 13. Proximity sensor 14 may also detect location (e.g., x, y, z), direction, speed and acceleration, orientation (e.g., roll, pitch, yaw), etc. of the finger relative to touchscreen 13. Proximity sensor 14 provides its information as an input to processor 12 when a finger is placed above touchscreen 13. This input can be used by processor 12 when generating haptic feedback for telephone 10.

Proximity sensor 14 may use any technology that allows the proximity of a finger or other object to touchscreen 13 to be sensed. For example, it may be based on sensing technologies including capacitive, electric field, inductive, hall effect, reed, eddy current, magneto resistive, optical shadow, optical visual light, optical IR, optical color recognition, ultrasonic, acoustic emission, radar, heat, sonar, conductive or resistive and the like.

In one embodiment, proximity sensor 14 includes one or more proximity sensors that each generate a sensing field above touchscreen 13 and that produce signals when an object disturbs or intercepts the sensing field(s). Each sensing field typically generates its own signals when disturbed. In one embodiment, a single sensing field is used to cover the entire touchscreen 13 surface. In another embodiment, a single sensing field only covers a portion of the touchscreen 13 surface. In another embodiment, multiple sensing fields are used to cover the entire touchscreen 13 surface. Any number of sensing fields may be used. In some cases, in order to perform tracking, the sensing fields may even be distributed as a pixelated array of nodes.

Figure 2:
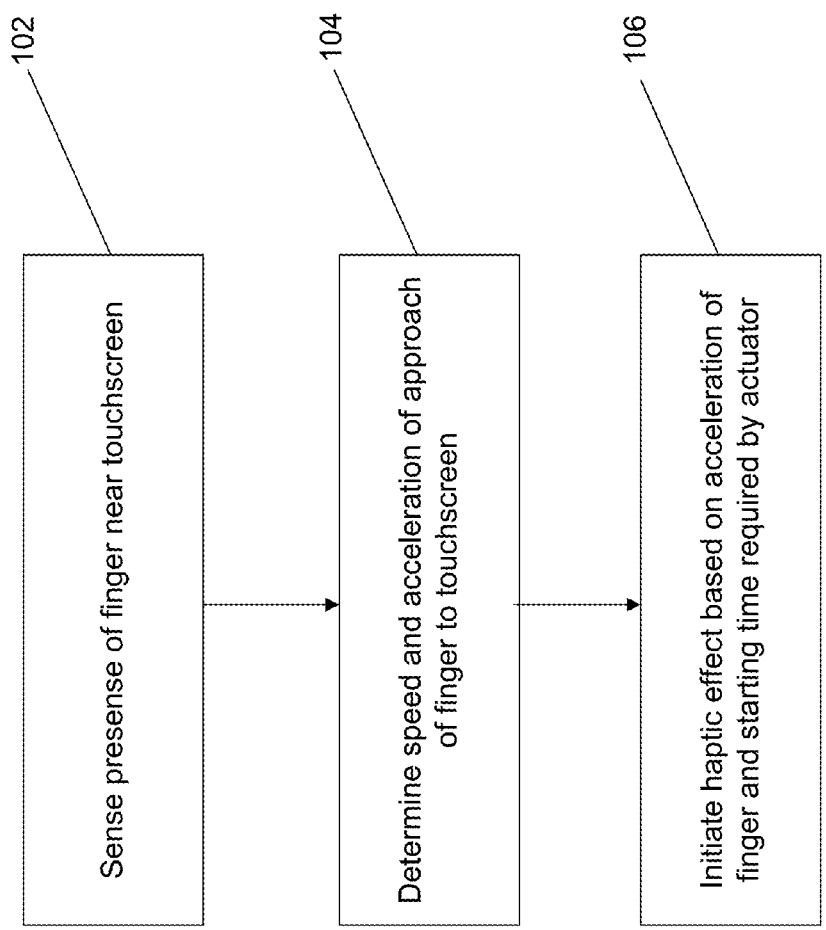
FIG. 2 is a flow diagram of the functionality performed by a telephone when generating haptic effects in response to the proximity of a user to a touchscreen in accordance with one embodiment.

FIG. 2 is a flow diagram of the functionality performed by telephone 10 when generating haptic effects in response to the proximity of a user to touchscreen 13 in accordance with one embodiment. In one embodiment, the functionality of FIG. 2 is implemented by software stored in memory and executed by a processor. In other embodiments, the functionality can be performed by hardware, or any combination of hardware and software.

At 102, proximity sensor 14 senses the presence of a finger, stylus, or other object above or in some other manner near touchscreen 13 or other input area of telephone 10.

At 104, proximity sensor 14 determines the position, speed and/or acceleration of the finger relative to the surface of touchscreen 13. This enables processor 12 to determine whether the user's finger will actually contact touchscreen 13. For example, if the proximity signal is increasing at a certain rate, it is highly likely that the user will contact touchscreen 13 and press a button.

At 106, based on the determination at 104, processor 12 can calculate when the finger is expected to contact touchscreen 13. In anticipation of this contact, processor 12 initiates the haptic effect before the actual contact, thus avoiding the lag time caused by actuator 18. Processor 12 may use the acceleration of the finger and the starting time required by actuator 18 to determine how far in advance to initiate the haptic effect and energize actuator 18. Therefore, the haptic effect will be implemented at approximately the exact time that the finger actually contacts touchscreen 13 and result in better synchrony of the haptic effect with the button press event. In another embodiment, processor 12 may initiate the haptic effect upon sensing the mere presence of the finger at 102.

In typical use of cell phones or PDA's, the user generally holds the device in one hand and uses the other hand to interact with the user interface such as touchscreen 13. For handheld haptic devices with proximity sensing this means that the user can sense the haptic feedback with the hand holding the device even though the finger has not yet touched the surface. Therefore, useful haptic effects can be created as a function of the proximity even when a finger never touches touchscreen 13.

In one embodiment, if a user is hovering a finger over the touchscreen and moving over a grid of displayed buttons, a first haptic effect can be played when the user is moving from over one button to over the next button. The first haptic effect can be a short soft haptic effect in order to simulate the feel of moving over the edge of one button to the next. This first haptic effect will give the user an indication of the button locations without the user activating the buttons. A second haptic effect can be played when the user actually touches the screen and acts to select the button. The second haptic effect can be a strong haptic effect simulating a sharp button click.

Figure 3:
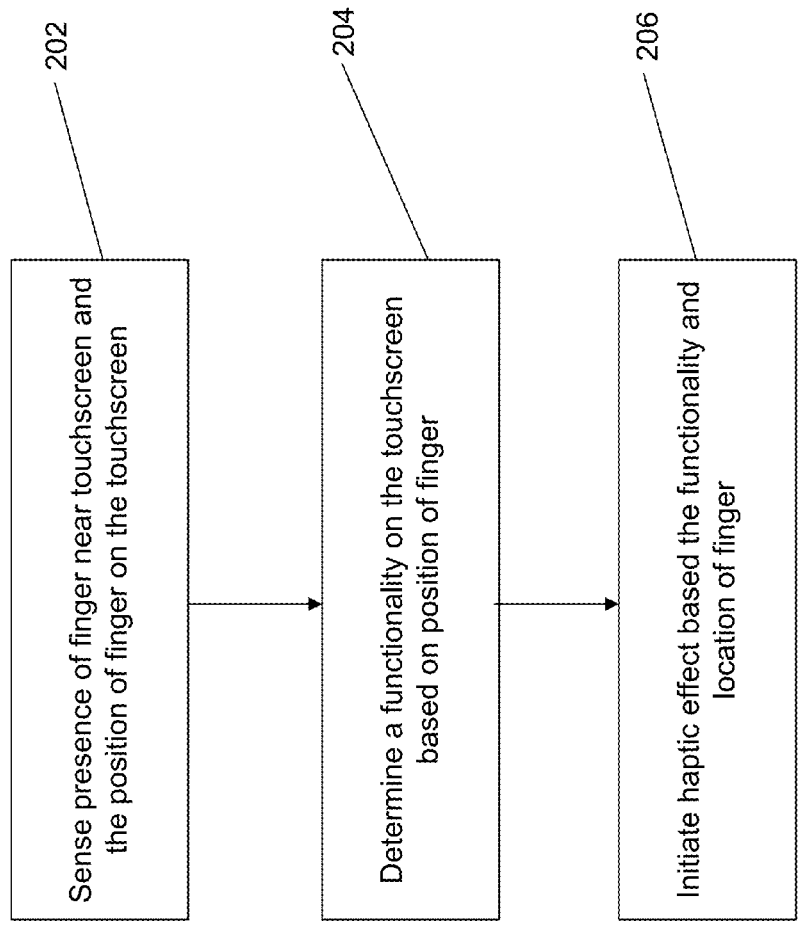
FIG. 3 is a flow diagram of the functionality performed by the telephone when generating haptic effects in response to the proximity of a user to the touchscreen in accordance with one embodiment.

FIG. 3 is a flow diagram of the functionality performed by telephone 10 when generating haptic effects in response to the proximity of a user to touchscreen 13 in accordance with one embodiment. In one embodiment, the functionality of FIG. 3 is implemented by software stored in memory and executed by a processor. In other embodiments, the functionality can be performed by hardware, or any combination of hardware and software.

At 202, proximity sensor 14 senses the presence and position of a finger, stylus, or other object above or in some other manner near touchscreen 13. The sensed position may include the x and y coordinates of the finger relative to touchscreen 13.

At 204, the functionality on the touchscreen is determined based on position of the finger. For example, if a multiple button graphical user interface on touchscreen 13 is displayed, the closest button that the finger is above and the functionality of that button is determined.

At 206, processor 12 initiates a haptic effect based the functionality and location of finger. Depending on the functionality on the touchscreen, a different haptic effect may be generated by processor 12. Because the finger does not actually touch touchscreen 13 in this embodiment, the haptic effect is felt by the other hand that is holding telephone 10.

In one embodiment, haptic effects can be applied to various menu navigation steps. For a user holding a hand held haptic enabled device, the haptics can be directed to the housing such that the user's hand holding the device will experience the haptic effect. For example, when using a touchscreen, if the user hovers over a top level menu choice and a sub-menu exists for that choice, then a light haptic effect simulating a soft button click (first haptic effect) can be played as the graphics display the preview sub-menu items. If there is no sub-menu attached to that particular menu item (or no valid choices exist) then a second haptic effect can be generated, for example a buzz created by series of pulses. If the user then selects the top level menu item, a strong haptic effect simulating a sharp button click (third haptic effect) can be played. If the user decides to move to another top-level menu a fourth haptic effect can be played when entering the new menu. The fourth haptic effect can be the same as the first haptic effect if it is a similar menu item. These haptic effects, resulting while a user finger is still hovering over a surface, i.e., before contract has been made, would be directed to the other hand that is holding the haptic device.

In one embodiment, different haptic effects can be applied depending on the intended use of the touchscreen area. For example, when a user's finger is hovering over a touch screen integrated into a cell phone or PDA, different haptic effects can be produced in the cell phone when in a map/GPS navigation mode than when managing climate control or when entering hand written notes.

In one embodiment, during typical operation of a cell phone, the user can have many different proximity relationships to the device. For example the cell phone could be in the user's hand, in the user's pocket, or right next to the user's face. These different operating conditions required different levels of haptic feedback to the user. A proximity sensor could be used to detect these different operating conditions. It is also possible to detect these user conditions through the use of acceleration and/or orientation measurements. Once the current operating condition of the device is known, for example holding the phone next to an ear, a global haptic volume adjustment could be made for the different operating states. In one example, the user could have a specific vibration pattern set for a reminder event. If the user has the phone attached to a belt clip the vibration pattern could contain strong haptic effects in order to signal the reminder event. If the user is actually using the phone and has the phone pressed up next to the user's face where the user will be more sensitive to the haptic effects, when the reminder event is triggered, it would be useful to have the haptic magnitude reduced for that event.

In one embodiment, gestures can be recognized such as a virtual jog dial. A jog dial recognizes rotation and when performed above a proximity active surface can be recognized without the surface being touched. A movement in the x, y and/or z direction can also be recognized. As an example, haptic effects can be attached to the use of the virtual jog wheel. A first haptic effect can be played at regular intervals of the jog wheel to give the user an indication and confirmation of progress in moving the wheel. A second haptic effect can be output when the user reaches the end of a list that the jog wheel is controlling. These jog and/or x, y, z motions can be recognized even when performed with proximity sensing, over a mechanical alpha/numeric keypad such as which exists on most cell phones today.

Several embodiments disclosed are specifically illustrated and/or described herein. However, it will be appreciated that modifications and variations are covered by the above teachings and within the purview of the appended claims without departing from the spirit and intended scope of the invention.

What is claimed is:

1. A method of generating a haptic effect on a device, the method comprising:
    detecting a position of an object relative to the device;
    based at least on the position, determining a gesture indicated by the object;
    based on the gesture, determining a functionality of the device; and
    generating the haptic effect on the device based on the gesture, wherein the haptic effect is generated without the object contacting the device and the haptic effect comprises haptic parameters that are based on the functionality.

2. The method of claim 1, wherein the object is a stylus.

3. The method of claim 1, wherein the position comprises a location of the object relative to the device.

4. The method of claim 1, wherein the position comprises an orientation of the object relative to the device.

5. The method of claim 1, wherein the determining the gesture comprises determining a movement of the object relative to the device based on multiple detecting of positions of the object relative to the device.

6. The method of claim 5, wherein the movement comprises a rotation.

7. The method of claim 4, wherein the orientation of the object is above the device.

8. The method of claim 4, wherein the orientation of the object is near the device.

9. A non-transitory computer-readable medium having instructions stored thereon that, when executed by a processor, cause the processor to generate a haptic effect on a device, the generating comprising:
    detecting a position of an object relative to the device;
    based at least on the position, determining a gesture indicated by the object;
    based on the gesture, determining a functionality of the device; and
    generating the haptic effect on the device based on the gesture, wherein the haptic effect is generated without the object contacting the device and the haptic effect comprises haptic parameters that are based on the functionality.

10. The non-transitory computer-readable medium of claim 9, wherein the object is a stylus.

11. The non-transitory computer-readable medium of claim 9, wherein the position comprises a location of the object relative to the device.

12. The non-transitory computer-readable medium of claim 9, wherein the position comprises an orientation of the object relative to the device.

13. The non-transitory computer-readable medium of claim 9, wherein the determining the gesture comprises determining a movement of the object relative to the device based on multiple detecting of positions of the object relative to the device.

14. The non-transitory computer-readable medium of claim 13, wherein the movement comprises a rotation.

15. The non-transitory computer-readable medium of claim 12, wherein the orientation of the object is above the device.

16. The non-transitory computer-readable medium of claim 12, wherein the orientation of the object is near the device.

17. A haptically enabled device comprising:
 a sensor;
 a processor coupled to the sensor; and
 a haptic feedback system coupled to the processor;
 wherein the processor is adapted to:
  detect a position of an object relative to the device based on a signal received from the sensor;
  based at least on the position, determine a gesture indicated by the object;
  based on the gesture, determining a functionality of the device; and
  generate the haptic effect on the device using the haptic feedback system based on the gesture, wherein the haptic effect is generated without the object contacting the device and the haptic effect comprises haptic parameters that are based on the functionality.

18. The device of claim 17, wherein the object is a stylus.

19. The device of claim 17, wherein the position comprises a location of the object relative to the device.

20. The device of claim 17, wherein the position comprises an orientation of the object relative to the device.

21. The device of claim 17, wherein the determine the gesture comprises determining a movement of the object relative to the device based on multiple detecting of positions of the object relative to the device.

22. The device of claim 21, wherein the movement comprises a rotation.

23. The device of claim 20, wherein the orientation of the object is above the device.

24. The device of claim 20, wherein the orientation of the object is near the device.

* * * * *